(12) United States Patent
Maunz et al.

(10) Patent No.: US 12,379,484 B2
(45) Date of Patent: Aug. 5, 2025

(54) GPR SCANNING THROUGH THE USE OF EXTERNAL SCENE KNOWLEDGE

(71) Applicant: HEXAGON TECHNOLOGY CENTER GMBH, Heerbrugg (CH)

(72) Inventors: Johannes Maunz, Rebstein (CH); Katrin Mentl, Marbach (CH); Jan Glückert, Lindau (DE)

(73) Assignee: HEXAGON TECHNOLOGY CENTER GMBH, Heerbrugg (CH)

( * ) Notice: Subject to any disclaimer, the term of this patent is extended or adjusted under 35 U.S.C. 154(b) by 858 days.

(21) Appl. No.: 17/190,960

(22) Filed: Mar. 3, 2021

(65) Prior Publication Data
US 2021/0278524 A1 Sep. 9, 2021

(30) Foreign Application Priority Data
Mar. 4, 2020 (EP) ..................... 20160875

(51) Int. Cl.
*G01S 13/88* (2006.01)
*G01S 7/41* (2006.01)
(Continued)

(52) U.S. Cl.
CPC ............. *G01S 13/885* (2013.01); *G01S 7/411* (2013.01); *G06N 5/025* (2013.01); *G06V 20/58* (2022.01)

(58) Field of Classification Search
CPC .................................................. G01S 13/885
See application file for complete search history.

(56) References Cited

U.S. PATENT DOCUMENTS 6,670,906 B1 * 12/2003 Roberts ..................... G01S 5/16
342/22
8,240,773 B2 * 8/2012 Hargrave .............. E21F 17/185
299/11
(Continued)

FOREIGN PATENT DOCUMENTS

CN 101907731 A 12/2010
CN 103317846 A 9/2013
(Continued)

OTHER PUBLICATIONS

Zong et al., A Deep Learning Approach For Urban Underground Objects Detection From Vehicle-Borne Ground Penetrating Radar Data In Real-Time, Int. Arch. Photogramm. Remote Sens. Spatial Inf. Sci., XLII-2/W16, 293-299 (Year: 2019).*
(Continued)

*Primary Examiner* — Ladimir Magloire
*Assistant Examiner* — Eric K Hodac
(74) *Attorney, Agent, or Firm* — Maschoff Brennan

(57) ABSTRACT

A method for scanning an area using a ground penetrating radar (GPR) by moving the GPR along at least one scanning trajectory. The method includes determining at least one landmark object image feature by applying object detection techniques to images of the area to be scanned, determining a position and/or type of at least one landmark object corresponding to the at least one landmark object image feature in a scanning-area coordinate frame, determining a candidate position or candidate type of at least one candidate underground asset in the area to be scanned by using the determined position or type of the at least one landmark object determining the at least one scanning trajectory using the candidate position and/or candidate type of the at least one candidate underground asset.

14 Claims, 5 Drawing Sheets

(51) Int. Cl.
    *G06N 5/025*     (2023.01)
    *G06V 20/58*     (2022.01)

(56) References Cited

U.S. PATENT DOCUMENTS

| | | | | |
|---|---|---|---|---|
| 8,849,523 | B1 * | 9/2014 | Chan | A01G 25/167 |
| | | | | 701/50 |
| 11,263,538 | B1 * | 3/2022 | Minarovic | G06F 30/13 |
| 2002/0080057 | A1 | 6/2002 | Annan et al. | |
| 2005/0278123 | A1 * | 12/2005 | Alft | G01V 3/18 |
| | | | | 702/9 |
| 2020/0124718 | A1 * | 4/2020 | Noujeim | G01S 7/412 |
| 2021/0080564 | A1 * | 3/2021 | Nikishov | G06T 7/70 |
| 2021/0181371 | A1 * | 6/2021 | Butler | G01V 15/00 |

FOREIGN PATENT DOCUMENTS

| | | | | |
|---|---|---|---|---|
| CN | 108052600 | A | | 5/2018 |
| CN | 110274658 | A | | 9/2019 |
| EP | 2 641 661 | A1 | | 9/2013 |
| EP | 3 486 674 | A1 | | 5/2019 |
| EP | 2994773 | B1 * | 7/2023 | ............ G01S 13/874 |
| WO | WO-2014181240 | A2 * | 11/2014 | ............ G01S 13/874 |
| WO | 2018/042208 | A1 | | 3/2018 |

OTHER PUBLICATIONS

Zong et al., A Deep Learning Approach For Urban Underground Objects Detection From Vechicle-Borne Ground Penetrating Radar Data In Real-Time, Int. Arch. Photogramm. Remote Sens. Spatial Inf. Sci., XLII-2/W16, 293-299 (Year: 2019).*
EP Search Report in Application No. 20160875.9 dated Aug. 28, 2020.
Redmon et al., "You Only Look Once: Unified, Real-Time Object Detection" May 9, 2016, pp. 1-10, IEEE.
Liu, W., Anguelov, D., Erhan, D., Szegedy, C., Reed, S., Fu, C. Y., & Berg, A. C. (Oct. 2016). SSD: Single shot multibox detector. In European Conference on Computer Vision (pp. 21-37). Springer, Cham.
Huanhuan Chen et al., "Buried Utility Pipeline Mapping Based on Multiple Spatial Data Sources: A Bayesian Data Fusion Approach" Jan. 1, 2011.
Li Ailin, "Research on the Current Situation of Grouting Disease Detection of Bridge Prestressed Pipelines," Henan Building Materials, Issue 3, pp. 43-44 (Dec. 31, 2019).
CN Office Action dated Oct. 28, 2023 as received in Application No. 202110195363.5.

* cited by examiner

GPR SCANNING THROUGH THE USE OF EXTERNAL SCENE KNOWLEDGE

CROSS-REFERENCE TO RELATED APPLICATIONS

This application claims priority to European Patent Application No. 20160875.9, filed on Mar. 4, 2020. The foregoing patent application is herein incorporated by reference.

FIELD OF THE INVENTION

The present invention relates to a method a method for scanning an area using a ground penetrating radar (GPR) by moving the GPR along at least one scanning trajectory.

BACKGROUND

Ground penetrating radars (GPR) are used to detect underground assets noninvasively, i.e. without digging up the ground. GPRs use radar pulses to image the subsurface. The emitted radar pulses are reflected or refracted or scattered back to the surface when encountering a boundary between materials with different permittivity (electric polarizability), wherein the returned radar pulses are analyzed for underground assets. Typical underground assets to be detected are pipes carrying gas, water or electricity. GPRs are effective for locating plastic conduits or concrete storm and sanitary sewers, for example, which cannot be effectively located using standard electromagnetic induction utility locating tools as such tools can identify only conductive materials. Within an area to be scanned, GPRs are moved along trajectories to identify underground assets lying underneath the trajectories. Carrying out measurements with a GPR is time-consuming, because according to the state of the art an area to be scanned first needs to be partitioned by a measurement grid, wherein the GPR is moved along the measurement grid.

Typical environments in which ground scanning is to be done may not, however, require such a detailed scan as underground assets may not be uniformly distributed underneath the scanning area.

It is therefore an objective of the present invention to provide for an improved scanning procedure requiring fewer scans along scanning trajectories than needed by state-of-the-art GPR techniques.

BRIEF DESCRIPTION

This objective is achieved by realizing at least part of the features of the independent claims. Features which further develop the invention in an alternative or advantageous manner are described in the dependent patent claims.

Some aspects of the invention relate to a method for scanning an area using a ground penetrating radar (GPR) by moving the GPR along at least one scanning trajectory, wherein the following steps are performed: 1) determining at least one landmark object image feature by applying object detection techniques to images of the area to be scanned 2) determining a position and/or type of at least one landmark object corresponding to the at least one landmark object image feature in a scanning-area coordinate frame 3) determining a candidate position and/or candidate type of at least one candidate underground asset in the area to be scanned by using the determined position and/or type of the at least one landmark object, and 4) determining the at least one scanning trajectory using the candidate position and/or candidate type of the at least one candidate underground asset.

The term 'area' as understood in the invention refers to e.g. urban environments in which there exists a close relation between overground landmark objects and underground assets. Areas in which such a close relation likely does not exist, for example meadows without clearly detectable overground landmark objects, are not within the scope of the invention. The GPR is supposed to scan the subsurface of the area, i.e. the underground for underground assets. The images of the area to be scanned capture the overground scene on the other hand, i.e. the space above the surface below which underground assets may be found. The images of the area to be scanned may not only capture the direct space above the area but also neighboring space. The images may capture different aspects of the space above the surface below which underground assets may be found. Overground landmark objects may be detected not only directly above the area to be scanned, but may also be found in regions neighboring the area to be scanned.

Since candidate underground assets are estimated, candidate underground assets do not need to correspond to underground assets. An underground asset may be identified partly correctly, for example, with the candidate position of the candidate underground asset being slightly moved away from the correct position of the corresponding underground asset. A candidate underground asset may also be estimated fully correctly, or it may be wrongly estimated, wherein a candidate underground asset is predicted with a candidate position not corresponding to any nearby underground asset.

To scan an area for underground assets, a GPR is moved along at least one scanning trajectory, i.e. the movement of the GPR follows at least one scanning trajectory. In state-of-the-art GPR systems, the scanning trajectories form a measurement grid. To provide targeted scanning trajectories according to the invention, images of the area to be scanned are searched for landmark objects such as manholes or traffic lights associated to candidate underground assets. Since the images which are searched typically do not correspond to the actual 3D area to be scanned, but correspond to some projection of the 3D area to be scanned, the images are searched for landmark object image features corresponding to projected versions of the landmark objects onto the images. Any kind of image is possible as long as the image can be searched for landmark object image features, i.e. images may be provided by different imaging modalities. Using at least one landmark object image feature, the position of the at least one landmark object in a scanning-area coordinate system is determined. If corresponding landmark object image features in a plurality of images are found, structure from motion techniques, for example, may be used for determining the position of the at least one landmark object. In case only a single image is available in which landmark object image features may be detected and the size of the landmark object is known using some prior information, the position of the at least one landmark object may be determined as well. In any case, any algorithm may be used which can use landmark object image features to obtain position information about corresponding landmark objects for the sake of the invention.

The location of underground assets such as pipes carrying gas, water or electricity is typically related to overground landmark objects. According to the invention, candidate types and/or candidate positions of candidate underground assets may be determined from previously determined overground landmark objects. As an exemplary embodiment of the invention, if only the candidate types of candidate underground assets in the area to be scanned are determined, the scanning trajectories may lie on a measurement grid, wherein the grid width may be adapted based on the candidate types of the candidate underground assets. For a pipe carrying wires configured to transmit electricity, for example, the grid width may be smaller than for pipes carrying water.

The images of the area to be scanned may be obtained from an external source. For example, pre-stored images corresponding to a location of the GPR may be used. Depending on the current position of the GPR (obtainable via GPS, for example), such pre-stored images may be loaded from some external source, for example via a network accessing some remote server on which images are stored. Landmark object detection may also be directly carried out on the remote server using the images corresponding to the current position of the GPR. The scanning-area coordinate frame may be centered on the current position of the GPR, and the position of landmark objects may be expressed with respect to the current position of the GPR. Candidate underground assets and scanning trajectories may be determined on the remote server as well.

In an embodiment of the method for scanning an area according to the invention, the object detection is carried out using machine learning real-time object detection techniques, in particular by applying a single neural network to at least one of the images of the area to be scanned, wherein the single neural network divides the at least one image it is applied on into regions and predicts bounding boxes and probabilities for each region, wherein the predicted bounding boxes are weighted by the predicted probabilities, and the predicted bounding boxes and probabilities encode information about the location and type of the at least one landmark object.

Determining landmark object image features may be done using neural networks. An image may be searched for the occurrence of specific objects, wherein the search may provide the possible locations of a specific object in the image as well as the probabilities that the specific object is found at the identified location(s). The neural network may be trained to detect relevant landmark objects in images, wherein relevant in the sense of the invention relates to landmark objects having a potential impact on the occurrence of underground assets in the area to be scanned.

In another embodiment of the method for scanning an area according to the invention, the candidate position and/or candidate type of the at least one candidate underground asset are determined from at least the determined position and/or type of the at least one landmark object by using a rule-based algorithm, wherein the rule-based algorithm encodes prior craft-specific information, in particular building-industry specific information, on relationships between landmark objects and corresponding underground assets, wherein the candidate position and/or candidate type of the at least one candidate underground asset are provided in geometrical and classification form, the geometrical form summarizing the spatial location and extent of the at least one candidate underground asset and the classification form summarizing the type of the at least one candidate underground asset.

The rule-based algorithm may for example use a pre-stored table relating landmark objects to underground assets. If it is known that a pair of landmark objects is typically connected by underground assets, for example, the pre-stored table may comprise an entry specifying the type and geometric form of the connecting underground asset, wherein geometric form may denote whether the connecting underground asset is e.g. straight or bent. The pre-stored table may be further structured and include geographic information as a sorting criterion so that the same pair of landmark objects, for example, may correspond to different entries in the pre-stored table if the landmark objects are located in different geographic contexts, reflecting the fact that underground assets may be placed differently in different regions. Geographic information may for example be provided by a GPS sensor attached to or integrated into the GPR.

In another embodiment of the method for scanning an area according to the invention, the determined candidate type of the at least one candidate underground asset comprises information about at least one material of the at least one candidate underground asset.

Information obtained about a landmark object may be used for determining information about candidate underground assets corresponding to the landmark object. For example, if a landmark object is identified as a traffic light, it is likely that pipes leading to the traffic light provide electricity to the traffic light. Using such information as well as more detailed information about the materials such pipes are made of (depending for example on local regulations and industry-specific best practices), a candidate material of a pipe can be estimated, for example. It may also be possible to provide a list of candidate materials if multiple candidate materials are possible, wherein probabilities may be given for the different candidate materials.

In another embodiment of the method for scanning an area according to the invention, the at least one scanning trajectory is determined in such a way as to optimize detectability of at least a part of the at least one candidate underground asset.

If the presence of an underground asset is expected in the area to be scanned, the at least one scanning trajectory may be determined in such a way that data recorded by the GPR moved along the determined at least one scanning trajectory can be used to optimally test whether or not the expected underground asset is to be found at the expected position in the area to be scanned. If multiple underground assets are expected in the area to be scanned, the at least one scanning trajectory may be optimized for detectability of the multiple candidate underground assets. For both one and for multiple expected underground assets, the at least one scanning trajectory may be optimized for detectability of parts of the expected (candidate) underground asset(s), for example if only some parts of candidate underground assets are considered to be relevant. For example, start and end parts of a candidate underground asset may be considered to be relevant.

In another embodiment of the method for scanning an area according to the invention, the at least one scanning trajectory is orthogonal to a main direction of at least the part of the at least one candidate underground asset, in particular wherein the main direction corresponds to a direction in which a candidate underground asset embodied as an underground pipe is pointing, and the at least one scanning trajectory is provided with a start and end point.

The at least one scanning trajectory may also be at an oblique angle to a main direction of at least the part of the at least one candidate underground asset, in particular wherein the main direction corresponds to a direction in which a segment of a candidate underground asset embodied as an underground pipe is pointing, and the at least one scanning trajectory is provided with a start and end point.

For straight pipes, detectability may be optimized for a perpendicular-to-pipe scanning trajectory. If a bent pipe, for example, is expected, an oblique angle may be optimal for improving detectability, while also possibly reducing the number of scanning trajectories needed. A scanning trajectory along a straight pipe may improve planimetric and depth accuracy.

In another embodiment of the method for scanning an area according to the invention, the at least one scanning trajectory is placed in such a way as to not intersect the at least one candidate underground asset in the area to be scanned.

The at least one scanning trajectory may be placed partly in parallel to the at least one candidate underground asset. Such a parallel placement may be implemented in a rule-based manner, for example. Placing the at least one scanning trajectory in such a way as to not intersect expected underground asset(s) may be used to check whether the estimation of expected underground asset(s) proceeded correctly.

In another embodiment of the method for scanning an area according to the invention, a plurality of scanning trajectories is determined, wherein the scanning trajectories possess different directions and have different lengths.

The plurality of scanning trajectories may be distributed in such a way that in case the GPR is moved along the plurality of scanning trajectories, the recorded data allow to confirm or to refute the presence of the expected underground asset(s). As the scanning trajectories are adapted to the expected underground asset(s), the number of scanning trajectories may be smaller than the number of scanning trajectories needed in a state-of-the-art measurement grid scan.

In another embodiment of the method for scanning an area according to the invention, a current position and orientation of the GPR is determined in the scanning-area coordinate frame during movement along the at least one scanning trajectory using information provided by at least one sensor integrated into or attached to the GPR. The images of the area to be scanned are provided by using at least one image sensor, and the current position and orientation of the at least one image sensor is determined using a known geometrical relationship between the at least one image sensor and the GPR. The so obtained current position and orientation of the at least one image sensor are fused with the position and orientation of the at least one image sensor provided by a simultaneous localization and mapping (SLAM) algorithm to obtain an updated position and orientation of the at least one image sensor in the scanning-area coordinate frame, and an updated position and orientation of the GPR are determined by way of the known geometrical relationship between the GPR and the at least one image sensor using the updated position and orientation of the at least one image sensor.

Determining a current position of the GPR may be done in different ways. If the GPR has wheels, the relative revolution of the wheels of the GPR during movement may be used for obtaining position and orientation information. Current position information may also be obtained from a GPS receiver attached to or integrated into the GPR. If the images of the area to be scanned are provided by the at least one image sensor (and the at least one image sensor has a defined geometric relationship to the GPR), SLAM techniques may be used to track the current position and orientation of the at least one image sensor during movement of the GPR and hence also the current position and orientation of the GPR. The current position and orientation of the GPR obtained using SLAM techniques may be fused with position and orientation information provided by other sources, for example relative revolution of the wheels of the GPR and/or GPS data, thereby obtaining improved position and orientation information of the GPR. Data recorded by the GPR may then be referenced to the true position of the GPR at the time the data were recorded. The current position and orientation of the GPR in a pre-stored map of the environment may be obtained as well. Before entering an underground train tunnel, for example, GPS data may be used to obtain position information about the GPR. Once the GPR is moved into the underground train tunnel, position information may be obtained using SLAM, wherein SLAM may be used to update the initial position information provided by GPS before entering the underground train tunnel, for GPS may not be available in the underground train tunnel.

In another embodiment of the method for scanning an area according to the invention, a next determined scanning trajectory along which the GPR is to be moved next is projected onto the area to be scanned.

The GPR is moved along the at least one scanning trajectory. After the GPR has reached the end of a scanning trajectory, a next determined scanning trajectory along which the GPR is to be moved next is displayed. Displaying may be done using any projection technology such as a laser line projector. Besides physically projecting the next determined scanning trajectory onto the area to be scanned, the next determined scanning trajectory may be virtually displayed to a user of the GPR, for example using augmented reality techniques. Using augmented reality techniques, indicators of the next determined scanning trajectory may be virtually displayed to a user of the GPR, for example directional arrows and/or the length of the next determined scanning trajectory. Additionally, augmented reality techniques may be used for displaying a roll-pitch-yaw representation of the GPR, including nominal position information, to a user to allow portable GPR devices to display directional arrows. During movement of the GPR, the displaying of the next determined scanning trajectory along which the GPR is moving may be fixed by adapting projection parameters to take into account movement of the GPR. For this purpose, current position and orientation information of the GPR may be used.

In another embodiment of the method for scanning an area according to the invention, a signal is projected onto the area to be scanned to indicate the candidate position and/or candidate type of a candidate underground asset comprised by the at least one candidate underground asset.

A laser signal, for example, may be projected onto the area to be scanned to display the candidate position and/or candidate type of a candidate underground asset. Such displaying may also be done using augmented reality techniques, wherein the candidate position and/or candidate type of a candidate underground asset may be virtually presented to a user of the GPR. During movement of the GPR, the displaying of the candidate position and/or candidate type of a candidate underground asset may be fixed by adapting projection parameters to take into account movement of the GPR. For this purpose, current position and orientation information of the GPR may be used. An identified, that is confirmed underground asset may also be displayed on the area to be scanned.

Different types of laser signals may be projected onto the area to the scanned, wherein the different laser signals, for example differentiated by the frequency of the light, may represent different candidate types of candidate underground assets.

In another embodiment of the method for scanning an area according to the invention, an indication signal is provided to a user of the GPR to indicate that a start position of a scanning trajectory comprised by the at least one scanning trajectory is reached.

Once the start point of a scanning trajectory is reached, the user of the GPR may be notified about it. This way, the user knows that starting from the moment the notification is provided careful movement along the scanning trajectory may be required.

In another embodiment of the method for scanning an area according to the invention, an indication is provided to the user of the GPR about potential deviations of the moving GPR away from a current scanning trajectory along which the GPR is supposed to move.

In another embodiment of the method for scanning an area according to the invention, markers are used to indicate the location and spatial extent of the area to be scanned.

Examples of markers are chalk markings on streets and marking spray applied to arbitrary surfaces. Markers may also be digital, in particular if object detection is carried out on remote servers, the object detection applied to pre-stored images corresponding to a current position of the GPR. Such digital markers may then limit the region in the pre-stored images in which object detection is carried out.

Some aspects of the invention also relate to a computer program product with program code being stored on a machine readable medium or embodied as an electromagnetic wave, the program code being configured to provide the candidate location and/or candidate type of the at least one candidate underground asset and the at least one scanning trajectory in the area to be scanned using at least the images of the area to be scanned as in the method according to the invention.

Some aspects of the invention also relate to a GPR system comprising a GPR, a computing unit, a computer program product with program code according to the invention being stored on the computing unit, and at least one image sensor providing images to the computing unit.

The embodiments described herein allow for tailoring scanning trajectories along which a GPR is moved to external scene information. A more targeted scanning procedure of an area by a GPR is therefore made possible by the invention.

BRIEF DESCRIPTION OF THE DRAWINGS

The inventive system is described below in more detail purely by way of example with the aid of concrete exemplary embodiments illustrated schematically in the drawings, further advantages of the invention also being examined. Identical elements are labelled with the same reference numerals in the figures. In detail.

DETAILED DESCRIPTION

For the sake of having simple figures, it is assumed in FIGS. 1 to 6 that candidate underground assets and landmark objects are correctly detected, i.e. candidate underground assets fully correspond to underground assets and landmark objects are located correctly as well. Both of these assumptions need not be true, however, as both landmark object detection and candidate underground asset detection may sometimes produce faulty results.

Figure 1:
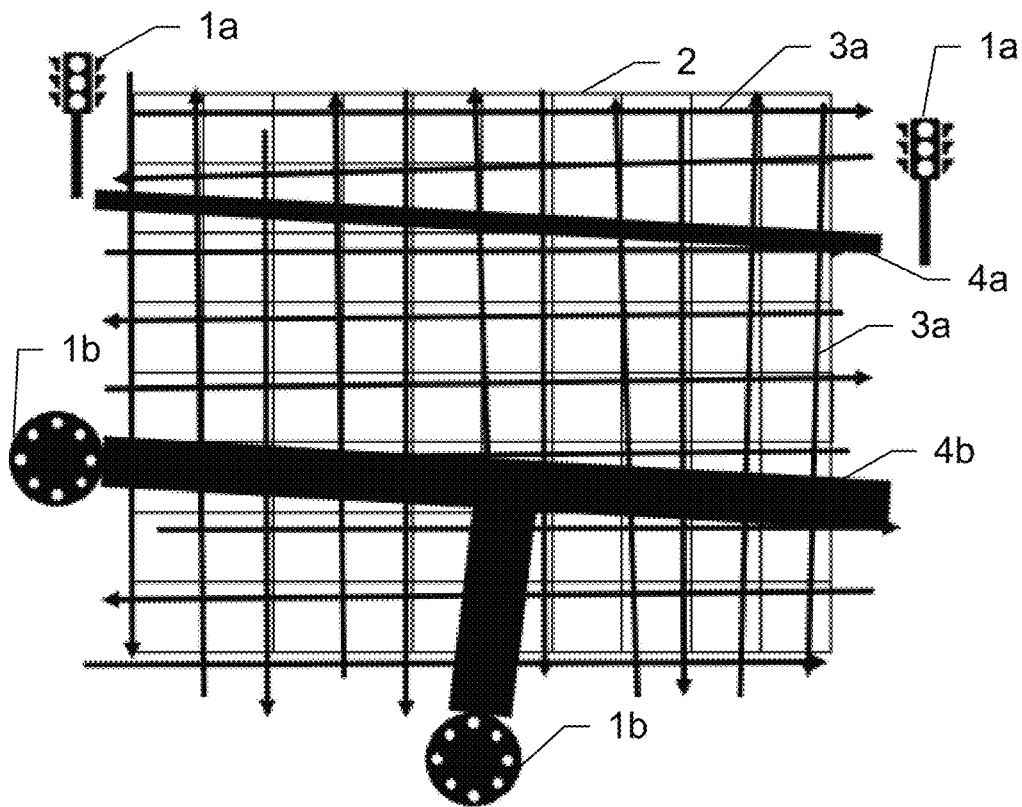
FIG. 1 shows a schematic and illustrative depiction of state of the art scanning trajectories of a ground penetrating radar (GPR)

FIG. 1 shows a schematic and illustrative depiction of state of the art scanning trajectories of a ground penetrating radar (GPR). An area to be scanned by the GPR is subdivided by a grid 2 imposed on the area. External landmark objects 1a, 1b structuring the area are typically not considered during the subdivision of the area by the grid 2. The GPR is moved along the grid 2. Real-world movement along the grid produces a movement pattern 3a deviating from the grid 2. Underground assets 4a,4b located in the area scanned by the GPR are detected by analyzing the data recorded by the GPR moved along the measurement trajectory 3a.

Figure 2:
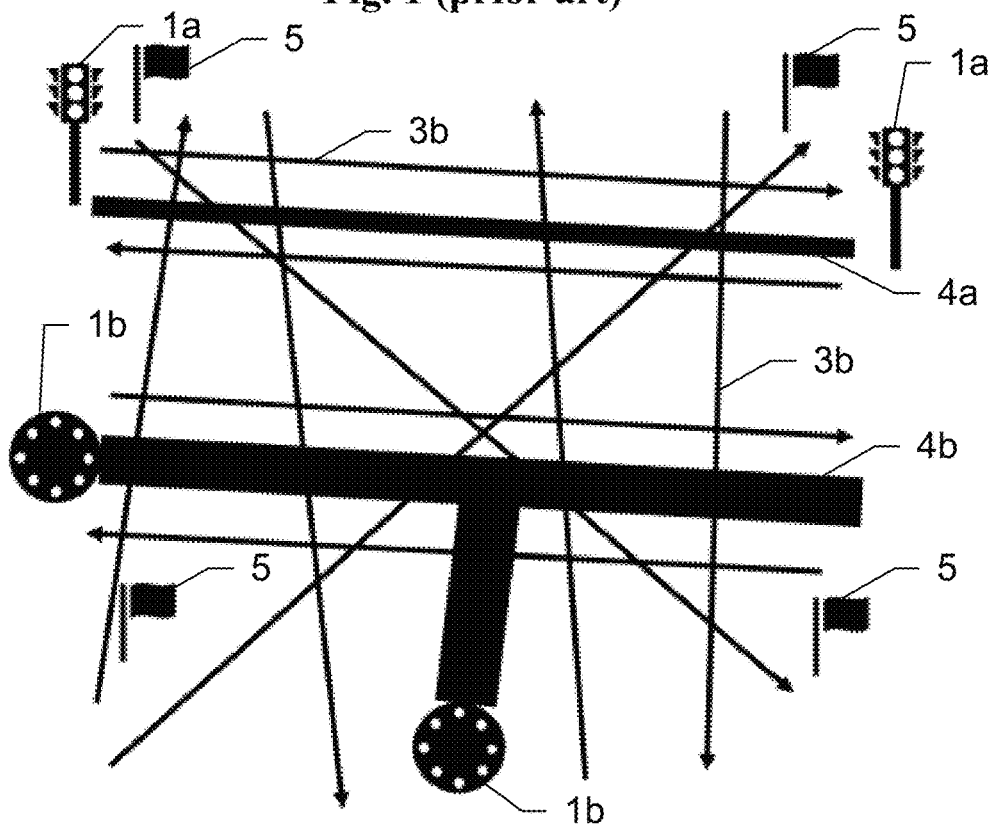
FIG. 2 shows a schematic and illustrative depiction of scanning trajectories of a GPR according to the invention.

FIG. 2 shows a schematic and illustrative depiction of scanning trajectories of a GPR according to the invention. An area to be scanned for underground assets 4a,4b by a GPR is typically structured by landmark objects, for example by traffic lights 1a or manholes 1b. Such landmark objects 1a, 1b provide indication about likely locations of underground assets 4a,4b. Construction-industry specific requirements typically restrict the possible locations of underground assets 4a,4b connected to such landmark objects 1a, 1b. Using such domain-specific knowledge, it is possible to infer likely locations of underground assets 4a,4b based on the detection of landmark objects 1a, 1b. Inferred likely locations of underground assets may comprise 3D coordinate information expressed in an underground coordinate system, or inferred likely locations of underground assets may be expressed using the surface of the area to be scanned, wherein the likely location of underground assets is projected onto the surface of the area to be scanned. Landmark objects 1a, 1b may be found using images taken by at least one image sensor. The image sensor may be embodied as a standard camera recording electromagnetic waves in the frequency range visible by the human eye. Using images recorded by the at least one camera, standard computer vision tools may be used for detecting landmark objects 1a, 1b in the images. Examples for such computer vision tools are the YOLO algorithm (Redmon, J., Divvala, S., Girshick, R., & Farhadi, A. (2016). You only look once: Unified, real-time object detection. In Proceedings of the IEEE Conference on Computer Vision and Pattern Recognition (pp. 779-788) or any of its improvements, e.g. (Liu, W., Anguelov, D., Erhan, D., Szegedy, C., Reed, S., Fu, C. Y., & Berg, A. C. (2016 October). SSD: Single shot multibox detector. In *European Conference on Computer Vision* (pp. 21-37). Springer, Cham.). The at least one image sensor may also be embodied as a laser scanner or as a lidar, wherein landmark object detection may be carried out on images provided by the laser scanner or the lidar.

The detection of landmark objects 1a, 1b does not in itself provide information about their position in 3D space. Corresponding detected landmark objects 1a, 1b identified in a plurality of images may be used to infer the 3D positions of the landmark objects, for example through the use of structure from motion techniques. 3D information about landmark objects 1*a*, 1*b* may be provided in the scanning-area coordinate frame which may serve as a reference frame. Alternatively, using a priori information on the real world (such as sizes of traffic lights etc.) the 3D position of detected landmark objects 1*a*, 1*b* may be obtained from single images.

Starting with such initial depth information of the detected landmark objects 1*a*, 1*b*, likely spatial locations of underground assets are inferred. The likely spatial locations may be provided in geometric form. For pipes as underground assets, the geometric form may comprise information on start and end point of the pipe, for example. In any case, the likely spatial locations of underground assets may be determined by using a priori knowledge such as construction-specific information. Once potential underground assets in an area to be scanned are determined, the candidate underground assets are used for finding scanning trajectories 3*b*. The scanning trajectories 3*b* as chosen according to the invention depend on the likely spatial location and/or type of candidate underground assets. Depending on the type and positions of potential underground assets, scanning trajectories may be placed in such a way as to traverse an underground asset in an orthogonal fashion. Alternatively, deliberately placed measurement trajectories which are non-orthogonal with respect to a possible underground asset may be chosen as well, for example to detect a candidate underground asset which is bent. In a simple embodiment, the width of an orthogonal grid (illustrated in FIG. 1) is optimized according to the expected underground assets. Pipes carrying electricity may typically be smaller than water pipes, so that the width of the orthogonal grid may be adapted to take such information into account. Once scanning trajectories 3*b* have been planned, the user of a GPR proceeds to move the GPR along the planned scanning trajectories 3*b*. To inform the user of the GPR about the current spatial position of the GPR, a visual simultaneous localization and mapping (SLAM) algorithm may be used, wherein features provided by way of the object detection techniques may be used. The current spatial position of the GPR may also be obtained from inertial sensors and/or GPS receivers, and/or from measuring relative rotations of wheels of the GPR in case the GPR has wheels. This way, the current position of the GPR and the positions of the planned scanning trajectories 3*b* may be graphically displayed to the user of the GPR (on a tablet, for example), and once the user of the GPR has reached a beginning of a next measurement trajectory, an indication signal may be provided to the user to indicate that a next valid measurement trajectory has been reached. The graphical displaying may be done on a tablet attached to the GPR, for example.

A next scanning trajectory along which the GPR may be moved may also be displayed in physical form to the user of the GPR, for example through a laser line projected onto the ground through a laser projector indicating the position of the next scanning trajectory. To keep the position of the projected laser line stable with respect to the moving GPR, the current position of the GPR, for example obtained through a visual SLAM algorithm, may be used to adjust the direction in which the laser projector projects the laser line. In a similar vein, a laser line stabilized with respect to GPR motion may be projected in such a way onto the ground as to be parallel to a candidate location of an underground asset.

Markers 5 may be placed in the area to be scanned, for example to limit the area which is to be scanned for potential underground assets. Object detection techniques and 3D landmark object estimation based thereon may then provide only those landmark objects for which it is likely that corresponding underground assets are located in the area enclosed by the markers 5.

Figure 3:
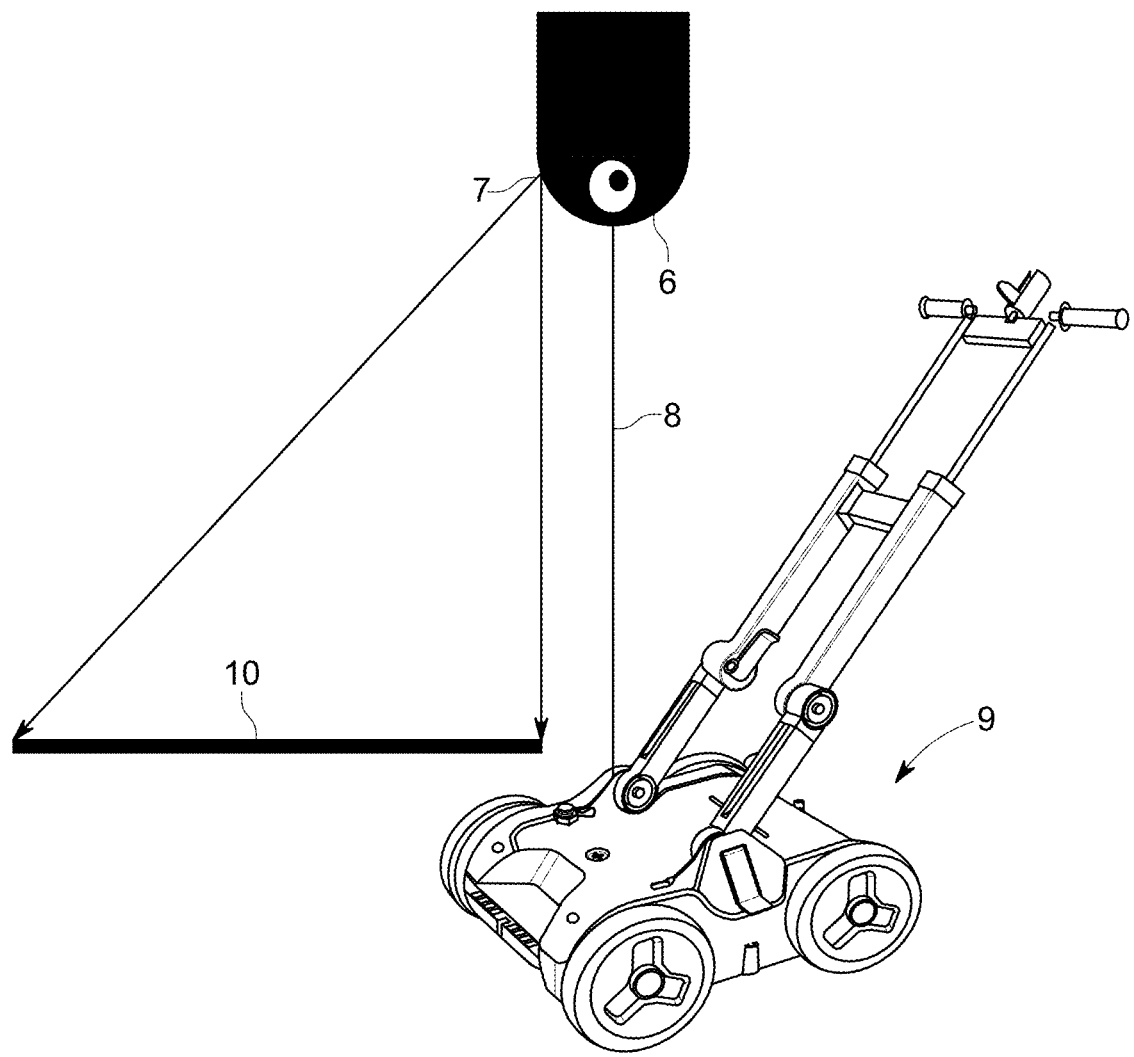
FIG. 3 shows an illustrative depiction of a GPR with a camera and a laser projector according to the invention.

FIG. 3 shows an illustrative depiction of a GPR with a camera and a laser projector according to the invention. An attachable elevation post 8 may be attached to the GPR 9. On top of the elevation post 8, a preferably rotatable camera 6 and a laser projector 7 may be mounted, wherein the laser projector 7 may project a laser line 10 onto the ground to indicate a next scanning trajectory to a user of the GPR 9 along which the GPR is to be moved.

Figure 4:
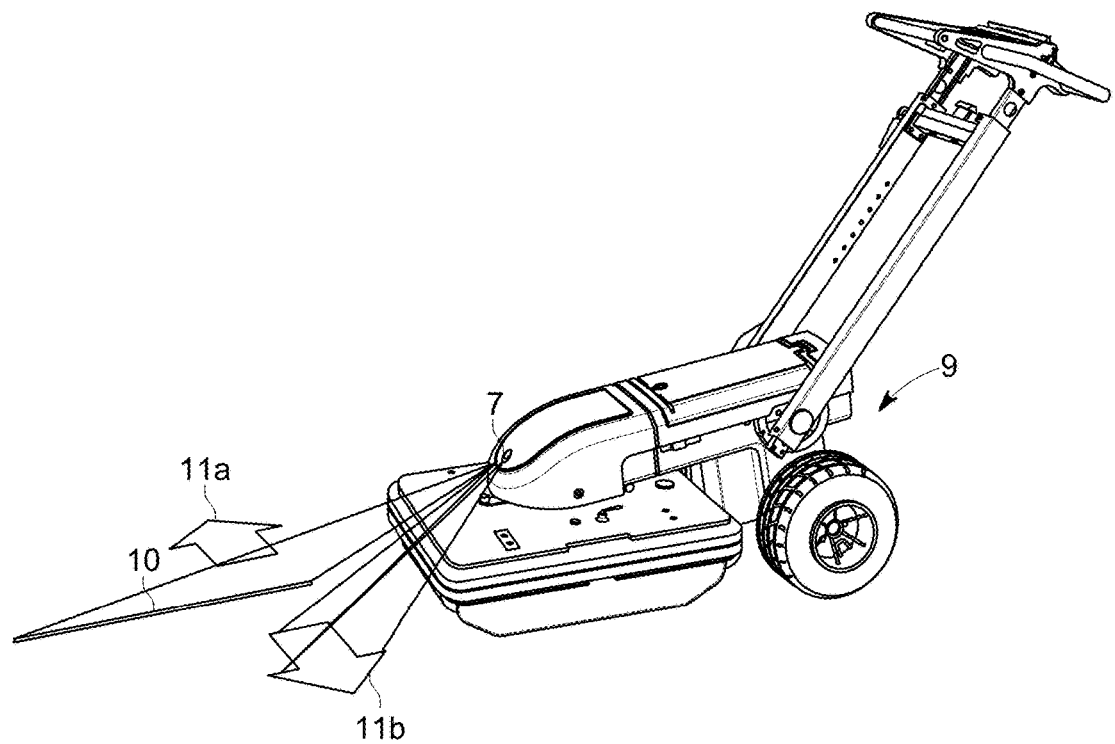
FIG. 4 shows an illustrative depiction of a GPR with a camera and a laser projector according to the invention.

FIG. 4 shows an illustrative depiction of a GPR with a camera and a laser projector according to the invention. A laser projector 7 may be integrated into the GPR 9. The laser projector 7 may project a laser line 10 onto the ground to display a next scanning trajectory to a user of the GPR 9, for example, or it may display a candidate underground asset. The laser projector 7 may also project directional information onto the ground, for example indicating whether the user of the GPR is to move left 11*b* or right 11*a* next.

Figure 5:
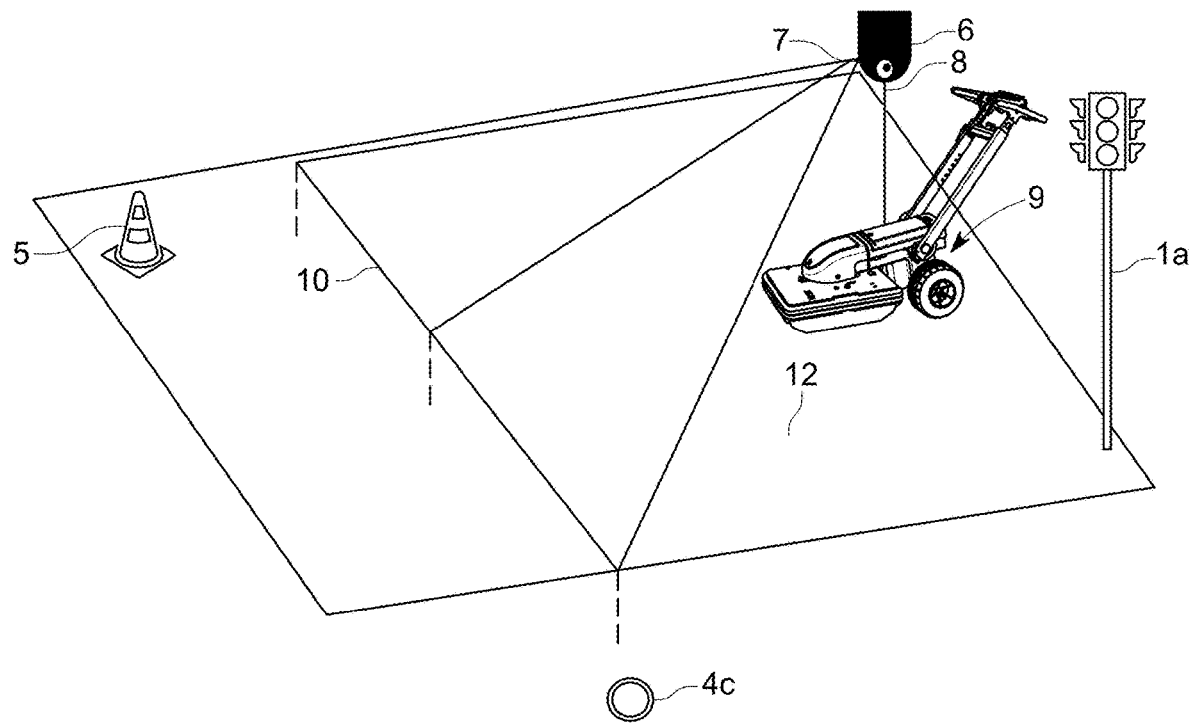
FIG. 5 shows an illustrative depiction of a GPR with a camera and a laser projector according to the invention.

FIG. 5 shows an illustrative depiction of a GPR with a camera and a laser projector according to the invention. An attachable elevation post 8 may be attached to the GPR 9. On top of the elevation post 8, a preferably rotatable camera 6 and a laser projector 7 may be mounted, wherein the laser projector 7 may project a laser line 10 onto the ground to indicate a candidate underground asset or a found underground asset 4*c* to a user of the GPR 9. The area to be scanned 12 may be determined using markers 5. Detected landmark objects 1*a* may be used for identifying candidate underground assets.

Figure 6:
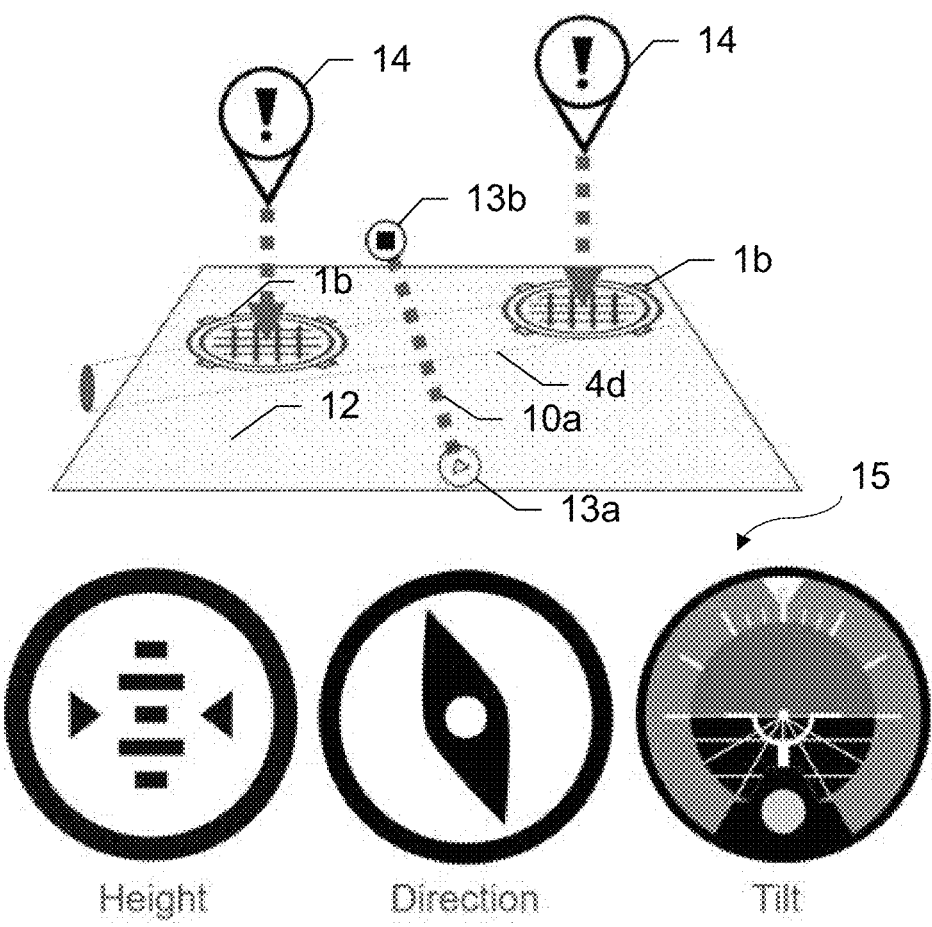
FIG. 6 shows an illustrative depiction of using augmented reality techniques to provide information to a user of a GPR.

FIG. 6 shows an illustrative depiction of using augmented reality techniques to provide information to a user of a GPR. Using augmented reality techniques, indication information relating to landmark objects 1*b* in an area to be scanned 12 may be provided to the user of the GPR, e.g. indications 14 about the location of landmark objects 1*b* used for determining a candidate underground asset 4*d*. Augmented reality techniques may also be used to display a start point 13*a* and an end point 13*b* of a next scanning trajectory 10 to the user of the GPR. To enable the providing of directional information to a user of portable GPR devices, a roll-pitch-yaw representation of the GPR along with a nominal position may be required, wherein the roll-pitch-yaw representation may be provided by the GPR. Height, tilt and direction 15 of the GPR may be displayed to the user, wherein height and tilt are only displayed for portable GPR devices.

Figure 7A:
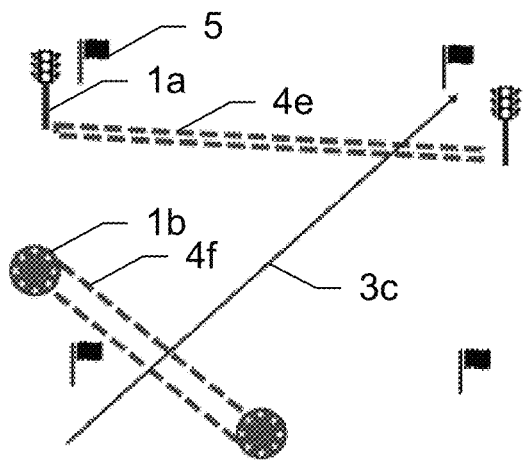
FIGS. 7a-d show an illustrative depiction of a sequential determination of scanning trajectories.
Figure 7B:
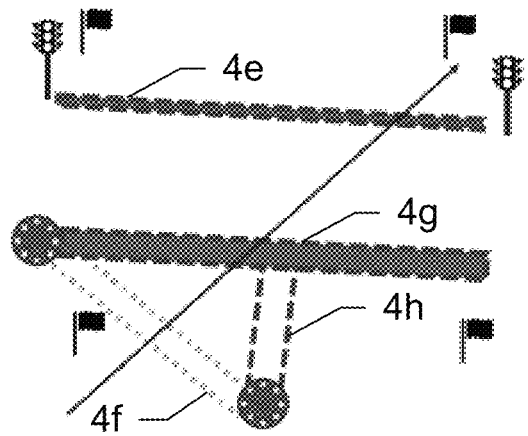
Figure 7C:
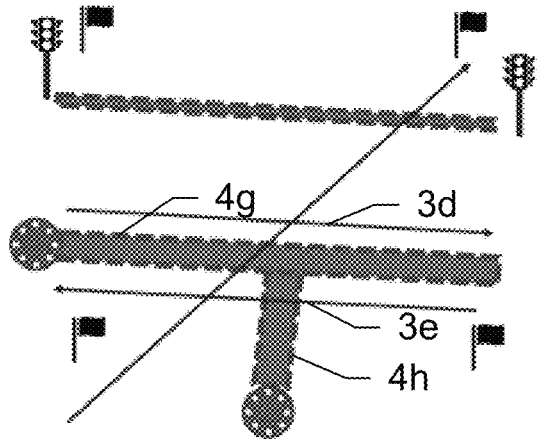
Figure 7D:
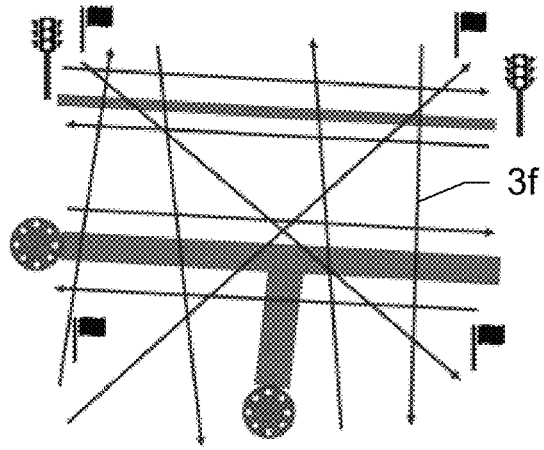

FIGS. 7*a-d* show an illustrative depiction of a sequential determination of scanning trajectories. In FIG. 7*a*, determined landmark objects 1*a*, 1*b* are used for determining a first set of candidate underground assets 4*e*,4*f*. The location and spatial extent of the area to be scanned may be indicated through the use of markers 5. Using the first set of candidate underground assets 4*e*,4*f*, a first scanning trajectory 3*c* may be determined. First measurement data obtained from moving the GPR along the first scanning trajectory 3*c* are used for confirming or disproving the presence of candidate underground assets in the first set of candidate underground assets. In FIG. 7*b*, for example, candidate underground asset 4*e* is confirmed using first measurement data obtained while moving the GPR along the first scanning trajectory 3*c*, while candidate underground asset 4*f* is disproved using the first measurement data. In FIG. 7*b*, two new candidate underground assets 4*g*,4*h* are subsequently proposed, wherein one 4*g* of the two new candidate underground assets 4*g*,4*h* may be confirmed using the first measurement data. New candidate underground assets 4*g*,4*h* may be determined based both on landmark objects 1a, 1b as well as previously acquired measurement data, e.g. the first measurement data for FIG. 7b. Given new candidate underground assets 4g,4h, new scanning trajectories 3d,3e may be determined as shown e.g. in FIG. 7c. The two new scanning trajectories 3d,3e as shown in FIG. 7c are used for confirming the presence of the new candidate underground assets 4g,4h. Subsequently, as shown in FIG. 7d, more scanning trajectories 3f along which the GPR is moved may be determined, the more scanning trajectories 3f further improving and strengthening the detection of underground assets in the area to be scanned. Scanning trajectories may therefore be iteratively determined based on both determined landmark objects as well as on previously acquired measurement data.

Although the invention is illustrated above, partly with reference to some preferred embodiments, it must be understood that numerous modifications and combinations of different features of the embodiments can be made. All these modifications lie within the scope of the appended claims.

The invention claimed is:

1. A method for planning at least one scanning trajectory for scanning an area using a ground penetrating radar (GPR) by moving the GPR along at least one planned scanning trajectory, the method comprising:
    determining at least one landmark object image feature by applying object detection techniques to images of the area to be scanned capturing an overground scene;
    determining a position or type of at least one landmark object corresponding to the at least one landmark object image feature in a scanning-area coordinate frame;
    determining a candidate position or candidate type of at least one candidate underground asset in the area to be scanned by using the determined position or type of the at least one landmark object; and
    determining the at least one planned scanning trajectory using the candidate position or candidate type of the at least one candidate underground asset,
        wherein the landmark object image feature is determined by the object detection techniques applied to the images that is carried out using machine learning real-time object detection techniques.

2. The method for scanning an area according to claim 1, wherein the candidate position or candidate type of the at least one candidate underground asset are determined from at least the determined position or type of the at least one landmark object using a rule-based algorithm, wherein the rule-based algorithm encodes known craft-specific information on relationships between landmark objects and corresponding underground assets, wherein the candidate position or candidate type of the at least one candidate underground asset are provided in geometrical and classification form, the geometrical form summarizing the spatial location and extent of the at least one candidate underground asset and the classification form summarizing the type of the at least one candidate underground asset.

3. The method for scanning an area according to claim 1, wherein the determined candidate type of the at least one candidate underground asset comprises information about at least one material of the at least one candidate underground asset.

4. The method for scanning an area according to claim 1, wherein the at least one scanning trajectory is determined in such a way as to optimize detectability of at least a part of the at least one candidate underground asset.

5. The method for scanning an area according to claim 4, wherein the at least one scanning trajectory is orthogonal to a main direction of at least the part of the at least one candidate underground asset and the at least one scanning trajectory is provided with a start and end point, or
    the at least one scanning trajectory is at an oblique angle to a main direction of at least the part of the at least one candidate underground asset and the at least one scanning trajectory is provided with a start and end point.

6. The method for scanning an area according to claim 1, wherein a plurality of scanning trajectories is determined, wherein the scanning trajectories possess different directions and have different lengths.

7. The method for scanning an area according to claim 1, further comprising:
    determining a current position and orientation of the GPR in the scanning-area coordinate frame during movement along the at least one scanning trajectory using information provided by at least one sensor integrated into or attached to the GPR;
    providing the images of the area to be scanned by using at least one image sensor;
    determining the current position and orientation of the at least one image sensor using a known geometrical relationship between the at least one image sensor and the GPR;
    fusing the so obtained current position and orientation of the at least one image sensor with the position and orientation of the at least one image sensor provided by a simultaneous localization and mapping (SLAM) algorithm to obtain an updated position and orientation of the at least one image sensor in the scanning-area coordinate frame; and
    determining an updated position and orientation of the GPR by way of the known geometrical relationship between the GPR and the at least one image sensor using the updated position and orientation of the at least one image sensor.

8. The method for scanning an area according to claim 1, further comprising: projecting a next determined scanning trajectory along which the GPR is to be moved next onto the area to be scanned.

9. The method for scanning an area according to claim 1, further comprising: projecting a signal onto the area to be scanned to indicate the candidate position or candidate type of a candidate underground asset comprised by the at least one candidate underground asset.

10. The method for scanning an area according to claim 1, further comprising: providing to a user of the GPR an indication signal to indicate that a start position of a scanning trajectory comprised by the at least one scanning trajectory is reached.

11. The method for scanning an area according to claim 1, further comprising: providing indication to the user of the GPR about potential deviations of the moving GPR away from a current scanning trajectory along which the GPR is supposed to move.

12. The method for scanning an area according to claim 1, further comprising: using markers to indicate the location and spatial extent of the area to be scanned.

13. A computer program product with program code being stored on a non-transitory machine readable medium,
    the program code being configured to provide the candidate location or candidate type of the at least one candidate underground asset and the at least one scanning trajectory in the area to be scanned using at least the images of the area to be scanned as in the method according to claim 1.

14. A GPR system comprising a GPR, a computing unit, a computer program product with program code according to claim 13 being stored on the computing unit, and at least one image sensor providing images to the computing unit.

* * * * *